United States Patent
Harrison et al.

(10) Patent No.: US 7,332,898 B1
(45) Date of Patent: Feb. 19, 2008

(54) DOUBLE-EDGE, STACKABLE PWM WITH BUILT-IN FEEDFORWARD

(75) Inventors: William Todd Harrison, Apex, NC (US); Xuening Li, Cary, NC (US); Stefan W Wiktor, Raleigh, NC (US); Larry Joe Wofford, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/695,181

(22) Filed: Apr. 2, 2007

Related U.S. Application Data

(60) Provisional application No. 60/822,659, filed on Aug. 17, 2006, provisional application No. 60/822,806, filed on Aug. 18, 2006.

(51) Int. Cl.
*G05F 1/40* (2006.01)
(52) U.S. Cl. .................................................. 323/268
(58) Field of Classification Search ................ 323/225, 323/265, 268, 282, 283, 351
See application file for complete search history.

(56) References Cited

U.S. PATENT DOCUMENTS

| | | |
|---|---|---|
| 6,819,577 B1 | 11/2004 | Wiktor et al. |
| 6,894,464 B2 * | 5/2005 | Zhang ......................... 323/268 |
| 6,897,636 B2 * | 5/2005 | Harris ......................... 323/272 |
| 6,903,537 B2 * | 6/2005 | Tzeng et al. ................. 323/268 |
| 6,943,535 B1 * | 9/2005 | Schiff .......................... 323/246 |
| 7,023,188 B1 * | 4/2006 | Rice ............................. 323/271 |
| 7,157,889 B2 * | 1/2007 | Kernahan et al. ........... 323/268 |

\* cited by examiner

*Primary Examiner*—Adolf Berhane
(74) *Attorney, Agent, or Firm*—J. Dennis Moore; W. James Brady, III; Frederick J. Telecky, Jr.

(57) ABSTRACT

A method and apparatus for use in a multi-phase power system. The power system is of the type having a plurality of Pulse Width Modulation (PWM) controllers including a first PWM controller and at least one second PWM controller. The first PWM controller generates at least one first PWM output signal based on a cyclic signal having a cyclically recurring parameter, and provides the cyclic signal including the cyclically recurring parameter to the second PWM controller. The second PWM controller generates at least one second PWM output signal based on the cyclic signal, and synchronizes the generation of the first and second output signals using the cyclically recurring parameter within the cyclic signal, thereby maintaining a predetermined phase relationship between the first and second output signals. The second PWM controller generates a cyclic, triangular RAMP waveform signal having a series of periods, the RAMP waveform having in each period a signal rising portion and a signal falling portion, and compares the RAMP waveform against an error signal to generate the second PWM signal, the RAMP waveform rising portion and falling portion being generated by charging and discharging, respectively, a capacitor. A feedforward path is provided by setting a charging current for the capacitor that is proportional to an input voltage.

6 Claims, 4 Drawing Sheets

DOUBLE-EDGE, STACKABLE PWM WITH BUILT-IN FEEDFORWARD

CROSS-REFERENCE TO RELATED APPLICATIONS

This application claims the benefit of priority of the U.S. patent application Ser. No. 60/822,806, filed Aug. 18, 2006 and U.S. patent application Ser. No. 60/822,659, filed Aug. 17, 2006.

TECHNICAL FIELD OF THE INVENTION

The present invention relates to switching power supplies, and more particularly relates to multiple phase switching power supplies that use pulse width modulation techniques.

BACKGROUND OF THE INVENTION

The unwaning desire to decrease the cost and size of switching power converters has put a focus on the output filter. However, smaller inductance and capacitance puts a more stringent requirement on the DC/DC controller, which will need to provide faster transient response through a higher bandwidth control loop. Double-edge pulse-width modulation (PWM) has shown some benefits over single-edge PWM in achieving higher bandwidth DC/DC controllers. This is discussed, for example, in "Control-loop bandwidth limitations for multiphase interleaving buck converters," by Yang Qiu, Kaiwei Yao, Yu Meng, Ming Xu, F. C. Lee and Mao Ye, *Nineteenth Annual IEEE Applied Power Electronics Conference and Exposition*, 2004. *APEC '04*, vol. 2, pp. 1322-1328. FIG. 1 shows an exemplary prior art double-edge PWM generated from an error signal (COMP) and a triangle wave oscillating signal (RAMP).

There is also a desire to provide a single PWM converter or module that can provide a wide range of input/output voltage and current ranges.

SUMMARY OF THE INVENTION

The following summary presents a simplified description of the invention, and is intended to give a basic understanding of one or more aspects of the invention. It does not provide an extensive overview of the invention, nor, on the other hand, is it intended to identify or highlight key or essential elements of the invention, nor to define the scope of the invention. Rather, it is presented as a prelude to the Detailed Description, which is set forth below, wherein a more extensive overview of the invention is presented. The scope of the invention is defined in the Claims, which follow the Detailed Description, and this section in no way alters or affects that scope.

The present invention provides a method and apparatus for use in a multi-phase power system. The power system is of the type having a plurality of Pulse Width Modulation (PWM) controllers including a first PWM controller and at least one second PWM controller. The first PWM controller generates at least one first PWM output signal based on a cyclic signal having a cyclically recurring parameter, and provides the cyclic signal including the cyclically recurring parameter to the second PWM controller. The second PWM controller generates at least one second PWM output signal based on the cyclic signal, and synchronizes the generation of the first and second output signals using the cyclically recurring parameter within the cyclic signal, thereby maintaining a predetermined phase relationship between the first and second output signals. The second PWM controller generates a cyclic, triangular RAMP waveform signal having a series of periods, the RAMP waveform having in each period a signal rising portion and a signal falling portion, and compares the RAMP waveform against an error signal to generate the second PWM signal, the RAMP waveform rising portion and falling portion being generated by charging and discharging, respectively, a capacitor. A feedforward path is provided by setting a charging current for the capacitor that is proportional to an input voltage.

These and other aspects and features of the invention will be apparent to those skilled in the art from the following detailed description of the invention, taken together with the accompanying drawings.

DETAILED DESCRIPTION OF THE PREFERRED EMBODIMENT

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Embodiments of the present invention may be employed to advantage in a Master/Slave PWM voltage regulator system. For example, a switching power supply ("SPS"), or converter, that has a ramp generator and a pulse width modulation ("PWM") comparator can be synchronously paralleled and interleaved with other SPSs of the same construction. This may be done by communicating a common clock and time signature between them. One SPS is set to be the Master and to know the number of time slots in a PWM cycle. This Master SPS sends out the clock with a time signature that indicates a time reference for all paralleled SPSs. All other SPSs are the Slave SPSs, which are set to recognize the characteristics of the time signature and their own time slot. By assigning time slots, each SPS can synchronously generate PWM pulses that are interleaved or overlapped with each PS in the system.

Figure 2A:
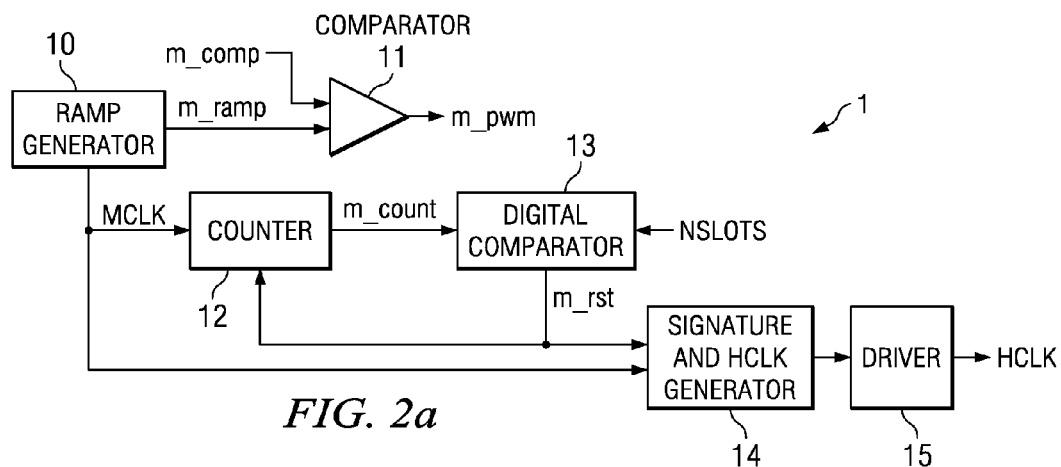
FIG. 2(a) is a diagram showing an SPS configured as a Master SPS 1.

Referring now to FIG. 2(a), there is shown an SPS configured as a Master SPS 1. Included are a ramp generator 10, PWM comparator 11, counter 12, digital comparator 13, signature and hclk generator 14, and a driver 15, all connected as shown.

The Master SPS 1 generates a PWM pulse, m_pwm, using the ramp generator 10, the PWM comparator 11, and an error signal, m_comp. The ramp generator 10 generates a triangular, or, sawtooth, signal, m_ramp, that is provided to one input of the PWM comparator 11. The error signal m_comp is a signal generated by other circuitry, and sets the "cut-off" threshold for the PWM comparator 11, by which the width of m_pwm is determined.

The ramp generator 10 also produces a synchronized clock, mclk, which has a frequency greater than the number of time slots, nslots, times the PWM frequency. The signal mclk is provided to the count input of the counter 12, and to one input of the signature and hclk generator 14. The counter 12 receives mclk and provides a count, m_count, of the mclk clock cycles to the digital comparator 13, which compares m_count to nslots. When m_count reaches nslots, then the digital comparator 13 sends a reset signal, m_rst, to the counter 12 to restart the counting, and to the other input of the signature and hclk generator 14. The signature and hclk generator 14 combines m_rst and mclk to create a clocking signal with a time signature, which is then put through a driver to create hclk. The time signature is a cyclically recurring parameter that functions to communicate the periodicity of the Master SPS signals, which Slave SPSs may use to time the start of the periods of their own signals. The driver functions as a conventional buffer to provide a "good" signal on the shared hclk line, i.e., having specified electrical characteristics required by the driven circuitry (not shown).

Figure 2B:
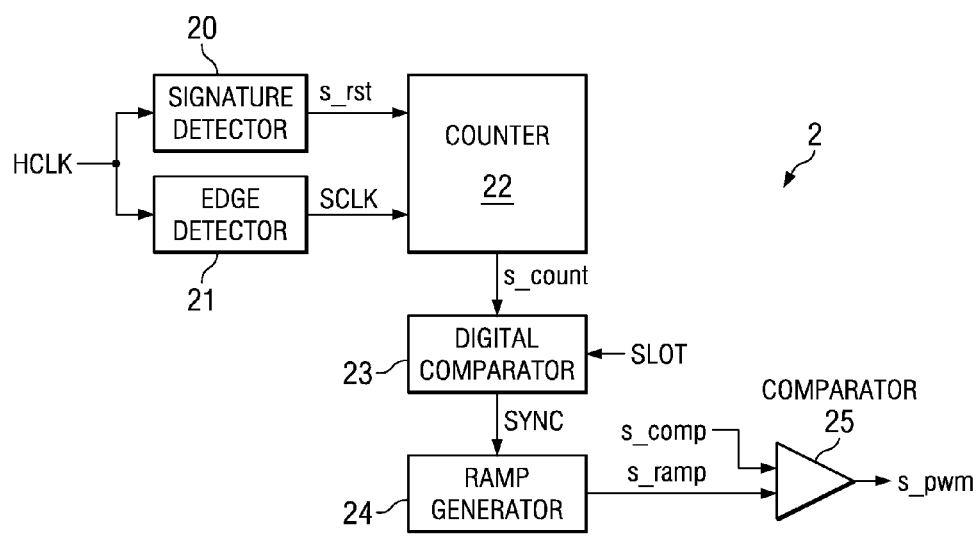
FIG. 2(b) is a diagram showing an SPS configured as a Slave SPS 2.

Referring now to FIG. 2(b), there is shown an SPS configured as a Slave SPS 2. Included are a signature detector 20, edge detector 21, counter 22, digital comparator 23, ramp generator 24 and PWM comparator 25, all connected as shown.

The common clock, hclk, is received from the Master SPS 1 by the Slave SPS 2 and provided to the input of the signature detector 20 and the input of the edge detector 21. The edge detector 21 creates a clocking signal, sclk, which is internal to the Slave SPS 2. When a time signature is recognized by the signature detector 20, it indicates this by asserting the s_rst signal. The s_rst signal resets the counter 22, whereupon it immediately restarts counting. The counter 22 receives the sclk signal and provides a count, s_count, of the sclk clock cycles to one input of the digital comparator 23. The other input of the digital comparator 23 receives a digital value, slot, which represents the relative phase of operation for that Slave SPS 2. The digital comparator 23 compares s_count with slot, and when s_count matches slot, the digital comparator 23 changes the digital state of a sync signal, which it provides as an output signal. The sync signal is then utilized by the ramp generator 24 to create s_ramp, which is, in turn, used by the pwm comparator 25 to compare with an error signal, s_comp, and to create the Slave SPS's PWM pulse, s_pwm. The Slave's s_pwm signal is therefore synchronized with the Master's m_pwm signal and all other Slave s_pwm signals.

Figure 2C:
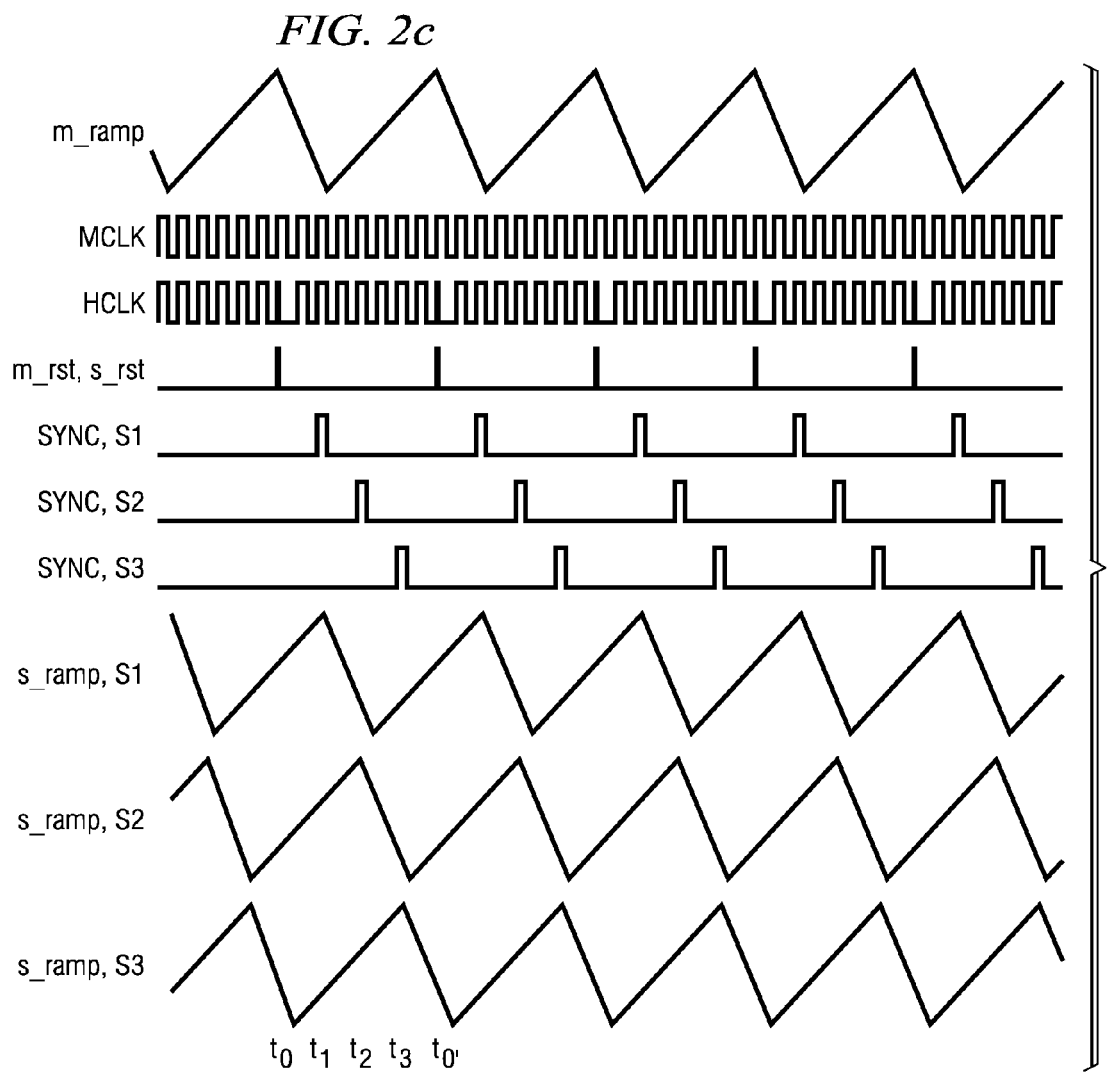
FIG. 2(c) is a group of graphs of voltage versus time, showing several signals in a system including a Master SPS 1 and three Slave SPS 2 as in FIGS. 2(a) and 2(b), vertically aligned to show relative timing.

Referring now to FIG. 2(c), this figure shows a group of graphs of voltage versus time, showing several signals in a system including a Master SPS 1 and three Slave SPS 2 as in FIGS. 2(a) and 2(b), vertically aligned to show relative timing. The signals shown are m_ramp, mclk, hclk, m_rst (which is substantially the same as s_rst), synch, S1 (the synch signal in the first Slave SPS 2), synch, S2 (the synch signal in the second Slave SPS 2), synch, S3 (the synch signal in the third Slave SPS 2), s_ramp, S1 (the s_ramp signal in the first Slave SPS 2), s_ramp, S2 (the s_ramp signal in the second Slave SPS 2), and s_ramp, S3 (the s_tramp signal in the third Slave SPS 2).

In this embodiment, the time signature is a modified width pulse in the hclk waveform. This is shown in the graph for signal m_rst in FIG. 2(c) with a "skinny" pulse, i.e., one that is relatively narrow compared to a clock pulse. In FIG. 2(c), the m_ramp signal is an oscillating triangular waveform with eight mclk cycles per period (nslots=7 in the Master SPS 1). The Master SPS 1 generates hclk with one skinny pulse at time t0, which coincides with the m_ramp change in direction, for every eight clock pulses. The Master SPS 1 and each Slave SPS 2 have a reset signal (m_rst and s_rst, respectively) that coincides with the skinny pulse event.

The counters start with a count of 0, establishing slot 0, and count up to 7, upon which the counters reset to 0, and the process repeats. Each count represents a slot that is assigned the number of the count. The skinny pulse is placed in slot 0, i.e., at time t0 in the first exemplary period shown in the figure. The first, second and third Slave SPSs have been assigned slot 2, 4, and 6, respectively, to create a synchronized, interleaved 4-phase system. Thus, it can be seen that the first Slave SPS generates its sync pulse at time t1, which coincides with slot 2, the second Slave SPS generates its sync pulse at time t2, and the third Slave SPS generates its sync pulse at time t3. Time t0' is slot 0 for the next period. Using these three sync pulses, the three Slave SPSs generate their respective s_ramp signals, with their change in direction coinciding with their respective sync pulses, as shown. It will be readily apparent to those of ordinary skill in this art area that there are alternate methods to synchronize the Slaves to a Master such that the required sync pulse is derived from the common clock, hclk, in the implementation of embodiments of the invention. For example, if the hclk signal is, instead, a triangular oscillating waveform with a predetermined period, then the cyclically recurring time of occurrence of a specified voltage level, say, on the falling slope of hclk, may be used as the parameter for communicating periodicity. In such a case, a Slave may derive the periodicity information from hclk simply by using a threshold comparator, and then generate its sync pulses based on that.

According to a preferred embodiment of the present invention, in one aspect a feedforward path is added, for example to the above-described PWM converter system, so as to support a wide input voltage range. This is particularly important in voltage-mode control. In another aspect, a Master/Slave PWM switching converter power supply system is provided that can support "stacking," i.e., multiple individual supplies that work in concert with one another to provide a single power supply, so as to providing a wide current range.

Figure 3A:
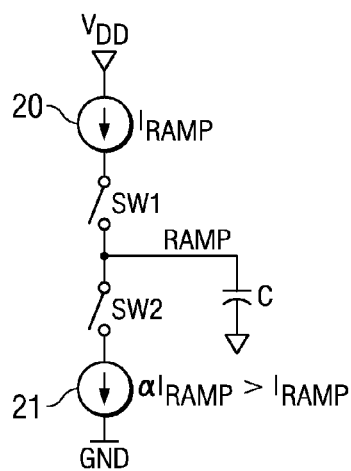
FIG. 3(a) is a diagram showing preferred circuitry for the generating a RAMP signal.
Figure 3B:
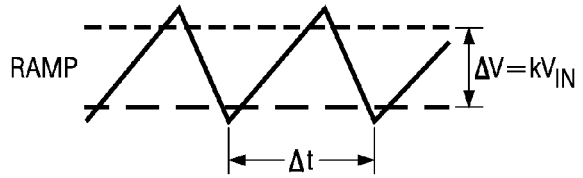
FIG. 3(b) is a graph showing the RAMP signal generated by the circuit of FIG. 3(a).

A Master PWM SPS, or, converter, must also be allowed to stand on its own; i.e., to provide a single-phase power supply; therefore, an internal oscillator is used in the Master PWM converter. To simplify the circuitry, the internal oscillator is also the RAMP signal, i.e., m_ramp, generator. FIG. 3(a) shows preferred circuitry for the generating the RAMP signal, while FIG. 3(b) shows the RAMP signal generated by the circuit of FIG. 3(a). A "window" voltage ΔV is set up to place a boundary on the oscillating RAMP signal. A current source 20 sourcing current $I_{RAMP}$, from a power supply at voltage $V_{DD}$, is connected to one terminal of a switch SW1, with the other terminal of switch SW1 is connected to one terminal of a second switch SW2 and to one plate of a capacitor C, the other plate of capacitor C being connected to ground. The other terminal of switch SW2 is connected to a current sink 21 sinking current $\alpha I_{RAMP}$, which is greater than current $I_{RAMP}$, to ground.

Current source 20 charges capacitor C until the capacitor voltage reaches the top of the window voltage. At that time, switch SW2 is turned on and switch SW1 is turned off and the RAMP signal voltage falls until hitting the bottom of the voltage window, and the cycle repeats. As explained in more detail below, the RAMP signal voltage passes the bounding voltage levels of the voltage window, due to comparator propagation delay. The fact that, in this embodiment, the discharge current is selected to be to $\alpha I_{RAMP}$ is also significant; this is discussed in more detail below.

To further simplify the circuitry, the feedforward path is wrapped into the RAMP generator. According to a preferred embodiment, this is accomplished by setting the charge/discharge current $I_{RAMP}$ proportional to the input voltage ($V_{IN}$). For example, for a factoring constant k, and assuming a termination resistance of $R_T$, $$I_{RAMP} = \frac{kV_{in}}{R_T}. \quad \text{Eq. (1)}$$

Figure 4:
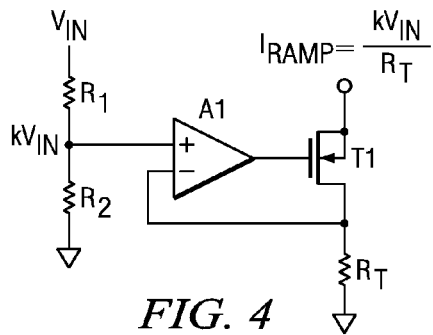
FIG. 4 is a diagram of a circuit for applying the inventive method.

FIG. 4 shows a simple method of deriving such a current. The resistor $R_T$ may be an external resistor, which allows the user to select the frequency of the RAMP signal oscillation. The input voltage $V_{IN}$ is divided by a resistive voltage divider consisting of two resistors, R1 and R2, connected in series between VIN and ground, with k being determined by the ratio of the resistors. The common connection node of resistors R1 and R2 is connected to the non-inverting input of an operational amplifier A1. The output of amplifier A1 is connected to the gate of an NMOS transistor T1. The source of transistor T1 is connected to receive the RAMP signal, while the drain is connected to one port of a termination resistor $R_T$, the other port of which is connected to ground. In this way, $I_{RAMP} = kV_{IN}/R_T$ is generated.

Given a RAMP signal period of Δt, as shown in FIG. 2(b), the period of oscillation, neglecting comparator delay, is $$T = \Delta t = \frac{C\Delta V}{I_{RAMP}} + \frac{C\Delta V}{\alpha I_{RAMP}}. \quad \text{Eq. (2)}$$

By creating the window voltage, ΔV:

$$\Delta V = kV_{IN}, \quad \text{Eq. (3)}$$

the oscillator is able to maintain a constant frequency even with changes in $V_{IN}$. Combining Equations (1)-(3) yields Equations (4) and (5):

$$T = \frac{CkV_{IN}}{kV_{IN}/R_T} + \frac{CkV_{IN}}{\alpha kV_{IN}/R_T}, \text{ and} \quad \text{Eq. (4)}$$

$$f = \left[R_T C \frac{(1+\alpha)}{\alpha}\right]^{-1}. \quad \text{Eq. (5)}$$

Table I shows appropriate component values for the circuit of FIG. 4, and the resulting frequencies. Note that comparator delay causes the resulting frequency to be longer than desired. It is therefore considered preferred to use a high speed comparator, so as to reduce this effect.

TABLE 1

FREQUENCIES FOR C = 13.3 pF and α = 2

| $R_T$ [kΩ] | f [kHz] |
| --- | --- |
| 25 | 2000 |
| 50 | 1000 |
| 100 | 500 |
| 200 | 250 |

Figure 1:
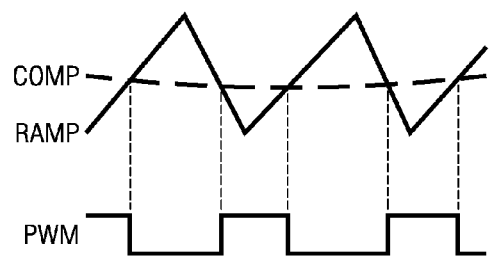
FIG. 1 is a waveform graph showing an exemplary prior art double-edge PWM generated from an error signal (COMP) and a triangle wave oscillating signal (RAMP).
Figure 5:
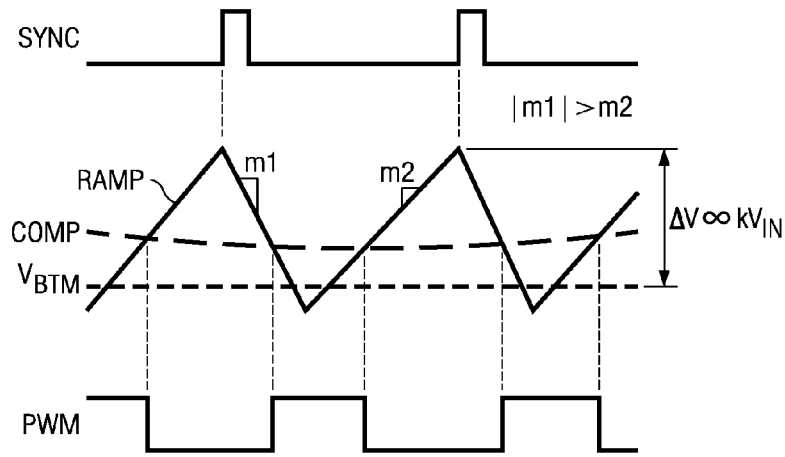
FIG. 5 is a graph of signals in a Slave PWM converter similar in form to that of FIG. 1, but showing also the SYNC signal and a low voltage swing limit voltage $V_{BTM}$.

Each Slave PWM converter should be synchronized with the Master PWM converter, in order to avoid multiple phases drawing current from $V_{IN}$ at the same time. Ways of accomplishing this are known, and can be found, for example, in "Dual or 2 Phase, Stackable Buck Controller," by John Li, Norman Mosher, Vwodek Wiktor, *Second TI Integrated Power Conference (IPC05)*, poster presentation, October 2005, and in U.S. Pat. No. 6,819,577, "Distributing Clock and Programming Phase Shift in Multiphase Parallelable Converters," which issued on Nov. 16, 2005, to Stefan Wlodzimierz Wiktor and Vladimir Alexander Muratov, and is commonly assigned, in addition to the system described above in connection with FIGS. 2(a) and 2(b). The following description assumes that such a system is provided, i.e., with a Master PWM converter and one or more Slave PWM converters, such that communication from the Master PWM converter provides a pulse, SYNC (e.g., sync in FIG. 2(b)), that causes the Slave PWM converter's RAMP (e.g., s_ramp in FIG. 2(b)) signal slope to turn negative. FIG. 5 is a diagram for a Slave PWM converter similar in form to that of FIG. 1, but showing also the SYNC signal and a low voltage swing limit voltage $V_{BTM}$. Signal voltage waveforms are shown, graphed voltage versus time, vertically aligned to show relative timing between the waveforms. The figure shows the RAMP waveform bounded at the bottom by the $V_{BTM}$ voltage, which is the same voltage that the Master PWM converter uses for the bottom of its window voltage, and at the top by the rising edge of SYNC. The Master PWM converter ensures that the SYNC rising edge occurs at such time to cause the Slave's RAMP amplitude to be equal to ΔV; this passes the frequency $V_{IN}$ cancellation on to each Slave PWM converter.

Figure 6A:
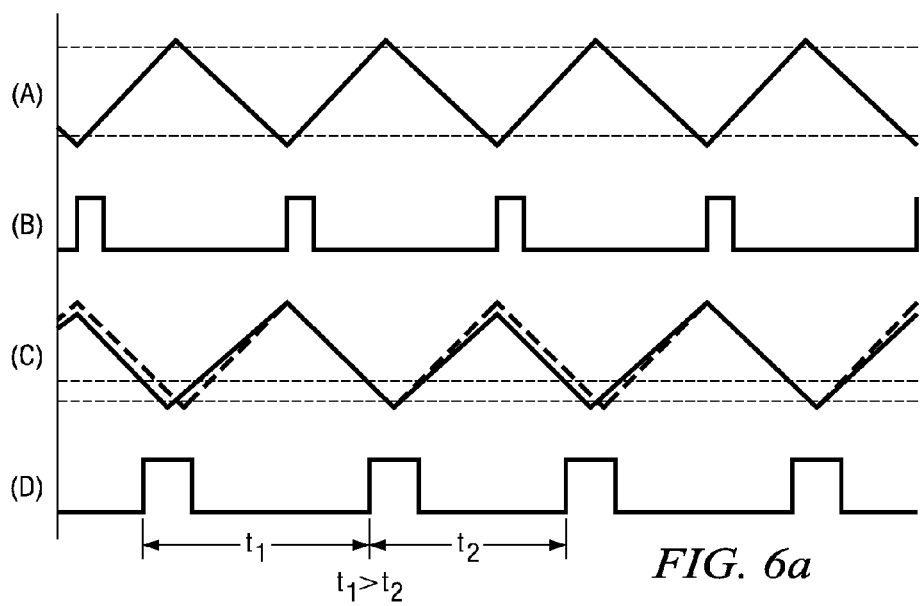
FIG. 6(a) is a graph of signal voltage waveforms illustrating an inventive principle.
Figure 6B:
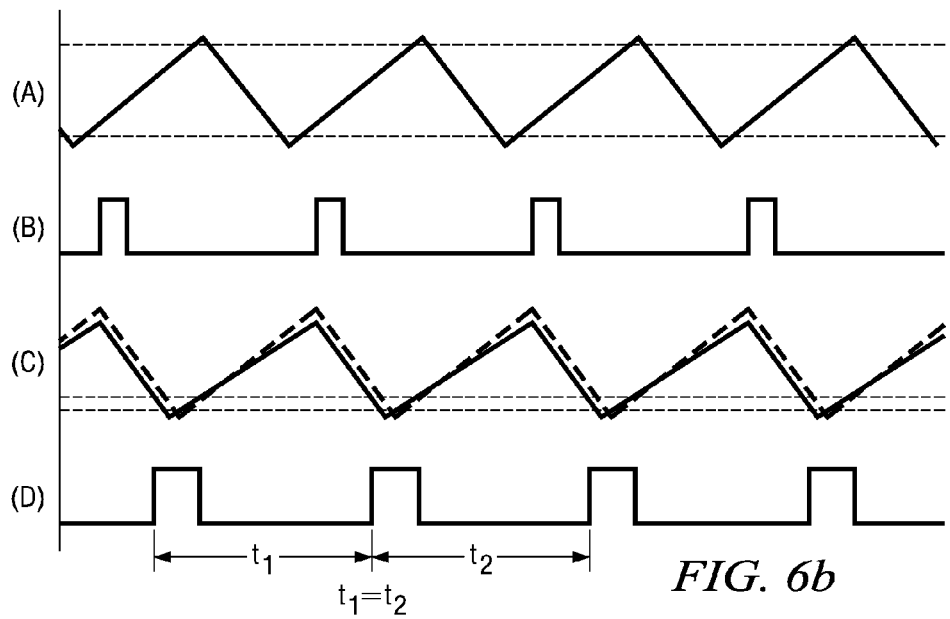
FIG. 6(b) is a graph of signal voltage waveforms for use in comparison with the waveforms of FIG. 6(a).

Because SYNC effects a resetting of the RAMP period, it is considered preferred to design the PWM converters such that subharmonic oscillations are minimized or avoided completely. FIGS. 6(a) and 6(b) show two different RAMP rise/fall ratios. Signal voltage waveforms are shown, graphed voltage versus time, vertically aligned to show relative timing between the waveforms. In both FIGS. 6(a) and 6(b) waveform (A) is the Master RAMP signal (solid line), with the horizontal dotted lines showing the respective upper and lower voltage boundaries, waveform (B) is the Slave SYNC signal, waveforms (C) are the Slave RAMP signal (solid line) and the ideal Slave RAMP signal (dashed line), with the upper dotted line showing the COMP signal, and the lower dotted line showing the lower voltage boundary in the Slave, and waveform (D) is the Slave PWM signal.

In FIG. 6(a) a RAMP signal rise/fall ratio of 1:1 ($\alpha=1$) is used, and subharmonic oscillating is evident in that $t_1$ is not equal to $t_2$. In FIG. 6(b) a RAMP signal rise/fall ratio of 5:3 ($\alpha=5/3$) is used, and subharmonics are suppressed.

Figure 7:
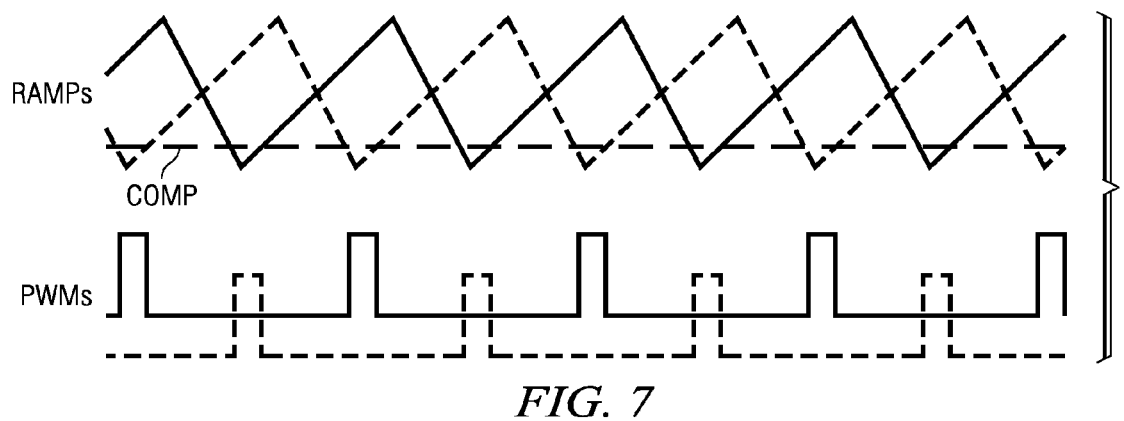
FIG. 7 is a graph showing waveforms for respective RAMP signals and PWM signals for a 2-phase example of a stacked PWM converter system.
Figure 8:
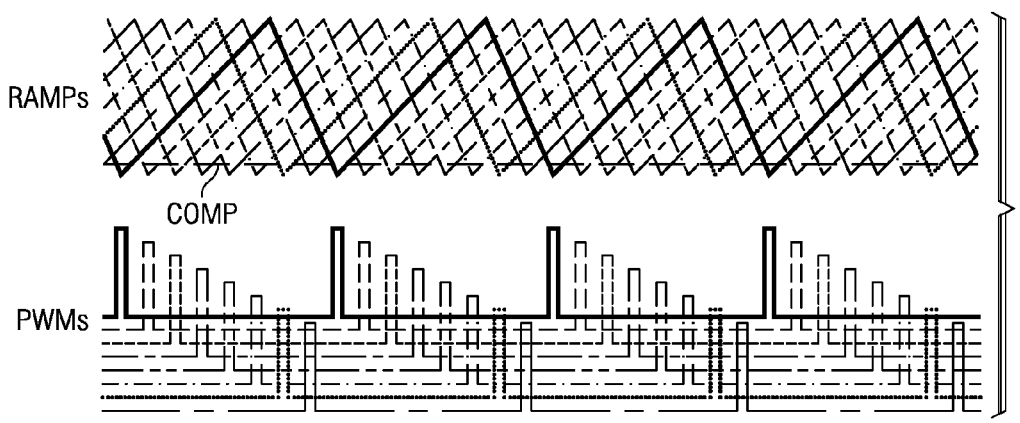
FIG. 8 is a graph showing waveforms for respective RAMP signals and PWM signals for an 8-phase example of a stacked PWM converter system.

Stacking PWM converters or power supply modules allows a great amount of flexibility. When the filter inductor of each supply is connected to the same output, a synchronized, multi-phase converter is created. FIG. 7 shows the respective RAMP signals and PWM signals for a 2-phase example, while FIG. 8 shows the same signals for an 8-phase example.

If each supply is rated at 20 amps maximum, then the user can stack eight supplies to enable 160 amps maximum output current. This topology also allows vertical stacking, i.e. supplies with a 0° phase shift, to provide high current outputs when there is a limit to the number of PWM time slots.

It should also be noted that separate output power supplies can be synchronized with this topology. Synchronizing separate power supplies can be useful when there is a need to suppress possible beat frequencies in a larger system.

Thus, an inventive PWM control method has been presented which uses a triangle, or, sawtooth, oscillating RAMP signal waveform to provide double-edge modulation. Feedforward is combined in the RAMP signal generation to allow voltage-mode control and a wide $V_{IN}$ range. A technique was also presented that allows the PWM converters to be stacked, thus making it easy for the user to scale supply capabilities to meet a variety of applications.

Although the present invention and its advantages have been described in detail, it should be understood that various changes, substitutions and alterations can be made herein without departing from the spirit and scope of the invention as defined by the appended claims.

What is claimed is:

1. A multi-phase power system, comprising:
   a plurality of Pulse Width Modulation (PWM) controllers including a first PWM controller and at least one second PWM controller;
   wherein the first PWM controller is configured to generate at least one first PWM output signal based on a cyclic signal having a cyclically recurring parameter, and to provide the cyclic signal including the cyclically recurring parameter to the second PWM controller;
   wherein the second PWM controller is configured to generate at least one second PWM output signal based on the cyclic signal, and to synchronize the generation of the first and second output signals using the cyclically recurring parameter of the cyclic signal, thereby maintaining a predetermined phase relationship between the first and second output signals;
   wherein the second PWM controller is configured to generate a cyclic, triangular RAMP waveform signal having a series of periods, the RAMP waveform having in each period a signal rising portion and a signal falling portion, and wherein the RAMP waveform is compared against an error signal to generate the second PWM output signal, the RAMP waveform rising portion and falling portion being generated by charging and discharging, respectively, a capacitor; and
   a feedforward path comprising means for setting a charging current for the capacitor that is proportional to an input voltage.

2. A multi-phase power system according to claim 1 further comprising means for setting a discharging current for the capacitor that is proportional to the input voltage.

3. A multi-phase power system according to claim 2 wherein the discharging current is proportional to the charging current.

4. In a multi-phase power system comprising a plurality of Pulse Width Modulation (PWM) controllers including a first PWM controller and at least one second PWM controller, a method for providing feedforward comprising the steps of:
   generating at least one first PWM output signal from the first PWM controller based on a cyclic signal having a cyclically recurring parameter;
   providing the cyclic signal including the cyclically recurring parameter to the second PWM controller;
   generating at least one second PWM output signal from the second PWM controller based on the cyclic signal, and synchronizing the generation of the first and second output signals using the cyclically recurring parameter within the cyclic signal, thereby maintaining a predetermined phase relationship between the first and second output signals;
   in the second PWM controller, generating a cyclic, triangular RAMP waveform signal having a series of periods, the RAMP waveform having in each period a signal rising portion and a signal falling portion, and comparing the RAMP waveform against an error signal to generate the second PWM signal, the RAMP waveform rising portion and falling portion being generated by charging and discharging, respectively, a capacitor; and
   providing a feedforward path by setting a charging current for the capacitor that is proportional to an input voltage.

5. A method according to claim 4 further comprising the step of setting a discharging current for the capacitor that is proportional to the input voltage.

6. A method according to claim 5 wherein the discharging current is proportional to the charging current.

* * * * *